United States Patent [19]
Whiteside

[11] Patent Number: 5,835,861
[45] Date of Patent: Nov. 10, 1998

[54] ENHANCED AUTOMATIC OPERATION OF WIRELESS TELEPHONES

[75] Inventor: Bruce Whiteside, Woodridge, Ill.

[73] Assignee: Lucent Technologies Inc., Murray Hill, N.J.

[21] Appl. No.: 912,044

[22] Filed: Aug. 15, 1997

Related U.S. Application Data

[63] Continuation of Ser. No. 654,796, May 29, 1996, abandoned, which is a continuation of Ser. No. 343,296, Nov. 22, 1994, abandoned.

[51] Int. Cl.[6] .................................................. H04Q 7/20
[52] U.S. Cl. ........................... 455/466; 455/419; 340/905
[58] Field of Search .................................. 455/403, 414, 455/418, 419, 422, 466, 550, 564, 575; 379/56.1, 56.3, 90.01, 110.01, 93.12, 93.13; 340/905, 928, 933, 825.44, 825.28, 825.29, 311.1; 235/384

[56] References Cited

U.S. PATENT DOCUMENTS

| | | | |
|---|---|---|---|
| 5,117,449 | 5/1992 | Metroka et al. | 379/58 |
| 5,127,042 | 6/1992 | Gillig et al. | 379/59 |
| 5,148,473 | 9/1992 | Freeland et al. | 379/57 |
| 5,150,116 | 9/1992 | West | 340/928 |
| 5,204,675 | 4/1993 | Sekine | 340/933 |
| 5,218,629 | 6/1993 | Dumond, Jr. et al. | 379/59 |
| 5,404,580 | 4/1995 | Simpson et al. | 455/89 |
| 5,410,326 | 4/1995 | Goldstein | 348/7 X |
| 5,488,360 | 1/1996 | Ray | 340/933 |
| 5,555,446 | 9/1996 | Jasinski | 340/825.44 X |

OTHER PUBLICATIONS

Kevin Holley, The GSM Short Message Service, Cellnet, 7/2, Jan. 1991.
Use of Dial logic T–1 In Telephone Company Networks p. 5, 1988, Dialogic Corporation.
ITG–Fachbericht 124, Sep. 1993, Heinz et al, "Der Short Message Service–ein neruer diest der digitalen Mobilkommunikation". Sep. 1993.
*The Bell System Technical Journal,* "Stored Program Controlled Network," Sep. 1982, vol. 61, No. 7, Part 3, pp. 1737–1745.
*Fujitsu Commander FX/ST,* "Cellular Mobile Telephone User Guide," copyright 1989, MO1P–2179–B002#U02, pp. 34–35.
*TR45 Baseline Text,* "Short Message Services for Wideband Spread Spectrum Cellular Systems," PN–3423, Nov. 7, 1994, pp. 4–2, 4–24.
*EDN Design Feature,* "RFDI Tags Connect Smart Cars to Smart Highways," Gary Legg, Dec. 22, 1994, pp. 33–36.
*AT&T Network Wireless Systems,* 1st Quarter Customer Events, "Frenkiel and Engel Win National Medal of Technology for Cellular Work," Richard Wallerstein, p. 7.
*Establish Service,* "Illinois Bell Advanced Customer Calling Services," Glen Ellyn Telephone Directory, Ameritech.

*Primary Examiner*—Dwayne D. Bost
*Assistant Examiner*—William G. Trost
*Attorney, Agent, or Firm*—Dennis J. Williamson

[57] ABSTRACT

A wireless telephone user obtains the telephone number of a vendor by activating the wireless telephone to receive to transmit a prompt signal to an active advertisement source and to receive from the advertisement source a response signal containing the telephone number of the advertising vendor. The telephone number can then be used to automatically place a call to that vendor. Advantageously this arrangement can be used to place a call to a vendor without having to either memorize the telephone number or to write it down.

9 Claims, 2 Drawing Sheets

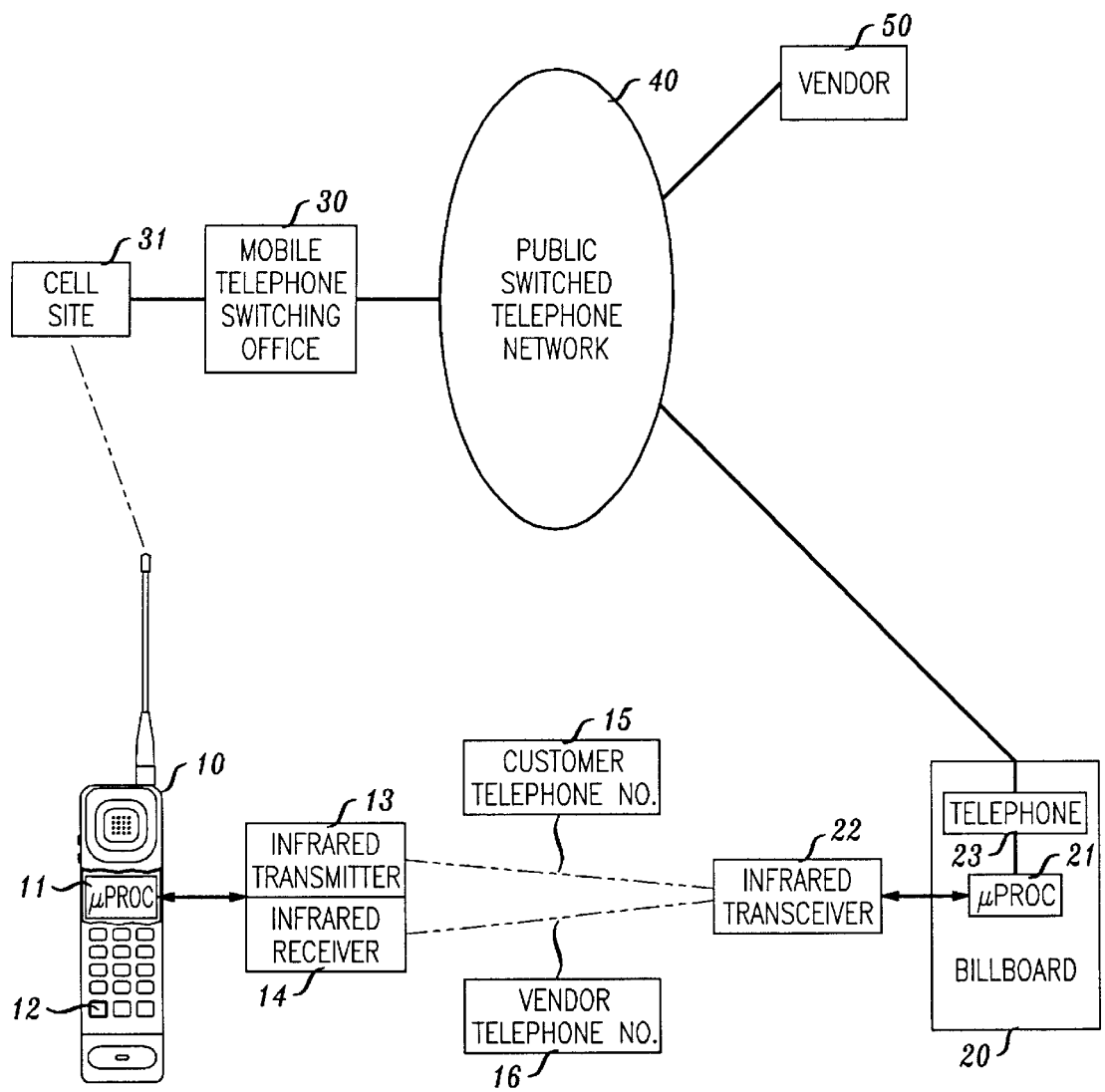

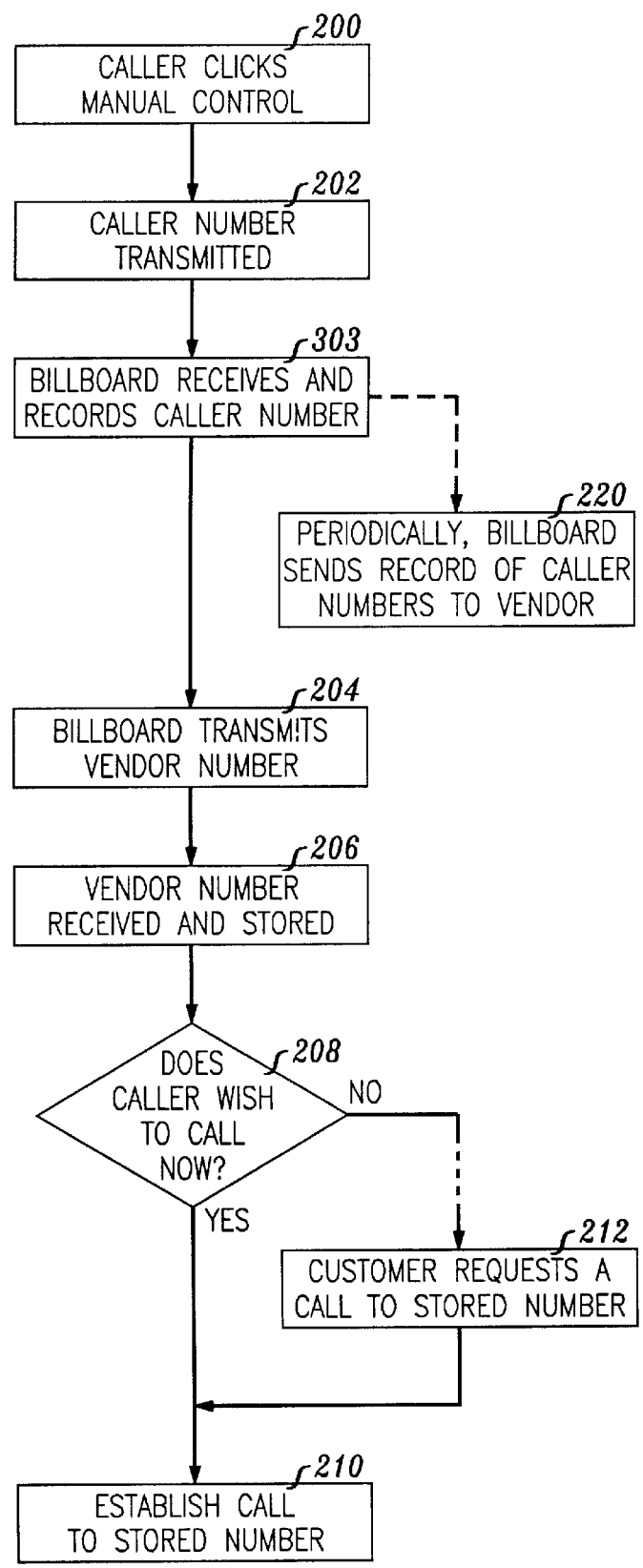

ENHANCED AUTOMATIC OPERATION OF WIRELESS TELEPHONES

This application is a continuation of application Ser. No. 08/343296, filed Nov. 22, 1994, now abandoned.

TECHNICAL FIELD

This invention relates to apparatus and methods for operating wireless telephones in conjunction with advertising or other displays.

PROBLEM

Use of wireless telephones especially portable wireless telephones is becoming increasingly prevalent, especially when these telephones are used while the caller is driving a moving vehicle it is inconvenient for the caller to stop to make note of a telephone number of a vendor who has an especially attractive product advertised for example on a billboard. Since the driver frequently cannot stop, a telephone number, possibly the name of the vendor may be forgotten. A problem of the prior art therefore is that it is difficult for a vendor to get immediate response from a wireless telephone user.

SOLUTION

The above problem is alleviated and an advance is made over the prior art in accordance with my invention wherein in an exemplary embodiment a caller passing a billboard display presses a single button on or makes a simple manual action on his/her wireless telephone. A moment later the wireless telephone receives a telephone number broadcast by the billboard which is equipped with broadcast facilities and the caller can immediately establish a connection to the telephone number suggested on the billboard. In one preferred embodiment the signals between the billboard and the caller are transmitted as modulated infrared signals similar to the kinds of signals used for communicating between a remote control and a television set.

In one preferred embodiment the billboard constantly repeats the telephone number of the vendor and the caller picks up this telephone number by activating the wireless telephone receiver through a manual operation. In accordance with another embodiment of the invention the caller's wireless telephone first transmits a request signal to the display and the display responds with the desired telephone number. Communications in both directions are via a modulated infrared signal.

BRIEF DESCRIPTION OF THE DRAWING

FIG. 1 is a block diagram illustrating the operation of applicant's invention; and FIG. 2 is a flow chart illustrating the method used for implementing applicant's invention.

DETAILED DESCRIPTION

FIG. 1 shows a wireless telephone 10 equipped with a microprocessor 11. This microprocessor is already available in wireless telephones and need simply be programmed to handle the extra functions required for applicant's invention. The microprocessor controls an infrared transmitter 13 and receives signals from an infrared receiver 14. Units such as Quality Technology Semiconductor's Infra Red Emitter 6266 QT can be used as the transmitter; Panasonic's PN116PA can be used as the receiver. The transmitter and receiver are activated by manual control 12 (essentially a push button) which also transmits the signal to the microprocessor to indicate that the process of finding a telephone number from the billboard is to be activated. The wireless telephone is connected by a radio link to a cell site 31 which is connected to a mobile telephone switching office 30. This mobile telephone switching office is connected to the public switch telephone network 40.

The billboard 20 is also provided with a microprocessor 21 for controlling and receiving signals from an infrared transceiver 22. (In view of the simplicity of the functions executed by the billboard, a few basic logic and small memory chips can be substituted for the microprocessor.) In the preferred mode of operation of applicant's invention the infrared transceiver simply broadcasts the telephone number of the vendor continuously. Shown is a link of that infrared broadcast which carries the telephone number of the vendor in data message 16. The contents of data message 16 are detected by infrared receiver 14 and passed on to to microprocessor 11. Depending on further requests by the caller the call can be immediately established or simply stored for subsequent establishment. The microprocessor 21 is connected to telephone 23 which is connected to the public switch telephone network 40 for accessing the vendor 50. The microprocessor can be used to transmit requests for the vendor's number. If an alternate feature of the invention is used namely one where wherein the wireless phone 10 is also connected to a infrared transmitter 13 and transmits the customer's telephone number in data message 15 when the manual control 12 is operated then the customer's telephone number may be forwarded via telephone 23 and PSTN 42 to the vendor 50. In order to allow the vendor to access records associated with the calling customer or to establish an additional record for a new potential customer.

Message 16 can also be used to convey other data, such as a bank interest rate, current product cost; message 15 can also be enhanced to make a more specific request for one of the items of information that can be supplied by the billboard.

The manual action 12 required to initiate the new process could have various forms, including but not limited to a single dedicated pushbutton, a combination of existing buttons pressed simultaneously (for instance, function and T) or a combination of existing buttons (for instance, Function 17) pressed sequentially.

FIG. 2 is a flow diagram illustrating the operation of applicant's invention. Block 200 indicates that the caller clicks the manual control 12. In response to this the caller number is transmitted from the wireless phone 10 to the billboard 20 (action block 202). The billboard receives and records the caller number (action block 203). Periodically, the record of caller numbers is sent to the vendor (action block 220). The billboard transmits the number of the vendor (action block 204) and the vendor number is received and stored in wireless telephone 10. Test 208 is used to determine whether the caller wishes to call now presumably one of the many buttons available on the wireless telephone can be used to make this request. If so then a call is established to the number which has been stored in the wireless telephone (action block 210) and the caller communicates with the vendor. If the caller does not wish to call now then this action is simply deferred until the customer requests a call be established to the stored number (action block 212) then the call is established to the stored number (action block 210) and the caller is connected to the vendor.

In an alternate embodiment the same functionality would be obtained by the use of radio frequency links between the wireless telephone and the billboard. In accordance with this embodiment the infrared transmitter 13, infrared receiver 14 would be replaced in the wireless telephone by its existing RF circuitry and antenna. The billboard would have an RF transceiver at 22 instead of the infrared transceiver. In a preferred alternative embodiment, a radio frequency adjacent to the regular wireless frequency band is used, which allows the radio frequency circuits of the wireless station to be used. Alternatively, since FCC Regulations Part 15 allows low power signals in the same radio frequency spectrum to be sent on a non-interfering basis, one of the wireless frequencies could be used. Alternatively, a frequency from the band used for cordless telephone could be used. The antenna of the wireless station can be used for this purpose.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of transmitting advertising information from a billboard to a wireless telephone where said wireless telephone is capable of transmitting signals at a regular wireless frequency band and at other than the regular wireless frequency band, comprising the steps of:

receiving a signal transmitted from a wireless telephone at a billboard, said signal being other than the regular wireless frequency band and, in response to receiving said signal, automatically transmitting a second signal from said billboard that is to be received and stored by said wireless telephone, said second signal including the advertising information related to said billboard, whereby the advertising information can be retrieved from the wireless telephone for use by a customer of the wireless telephone.

2. The method of claim 1, wherein the step of transmitting a signal includes transmitting the telephone number of said wireless telephone.

3. The method of claim 2, further including the step of transmitting said telephone number of the wireless telephone from said public display to an entity associated with said public display over a public switched network.

4. The method of claim 1, wherein said advertising information includes a telephone number.

5. The method of claim 4, further including the step of establishing a connection to said telephone number from said wireless telephone over a public switched network.

6. The method of claim 1, wherein the step of transmitting a signal from the wireless telephone includes the step of transmitting the signal over a frequency of a cordless telephone.

7. The method of claim 1, wherein the step of transmitting a signal from the wireless telephone includes the step of transmitting the signal over a frequency of the wireless frequency band adjacent to the regular wireless frequency band.

8. The method of claim 1, wherein the step of transmitting a signal from the wireless telephone includes the step of transmitting the signal over a frequency of an infrared signal.

9. A method of transmitting information from a publicly displayed advertising source to a wireless telephone comprising the steps of:

receiving a signal from a mobile wireless telephone at a billboard, said signal including the telephone number of the wireless telephone;

in response to receiving said signal: a) automatically transmitting a second signal from said billboard that is received and stored by said wireless telephone, said second signal including information related to said billboard, and b) automatically transmitting said telephone number of the wireless telephone from said billboard to an entity associated with said billboard; and storing said telephone number of the wireless telephone.

\* \* \* \* \*